United States Patent
Dudyala (10) Patent No.: US 10,755,218 B2
(45) Date of Patent: *Aug. 25, 2020

(54) SYSTEM AND METHOD FOR ANALYZING AND TUNING A MARKETING PROGRAM

(71) Applicant: RESPONSYS, INC., San Bruno, CA (US)

(72) Inventor: Dayanand Dudyala, Dublin, CA (US)

(73) Assignee: RESPONSYS, INC., Redwood Shores, CA (US)

(*) Notice: Subject to any disclaimer, the term of this patent is extended or adjusted under 35 U.S.C. 154(b) by 501 days.

This patent is subject to a terminal disclaimer.

(21) Appl. No.: 15/250,487

(22) Filed: Aug. 29, 2016

(65) Prior Publication Data

US 2016/0364662 A1    Dec. 15, 2016

Related U.S. Application Data

(63) Continuation of application No. 14/029,390, filed on Sep. 17, 2013, now Pat. No. 9,430,775.

(51) Int. Cl.
| | |
|---|---|
| *G06Q 10/00* | (2012.01) |
| *G06Q 10/06* | (2012.01) |
| *G06Q 30/02* | (2012.01) |
| *G06F 8/00* | (2018.01) |
| *G06F 11/30* | (2006.01) |

(52) U.S. Cl.
CPC .......... *G06Q 10/0633* (2013.01); *G06F 8/00* (2013.01); *G06F 11/30* (2013.01); *G06Q 10/067* (2013.01); *G06Q 30/02* (2013.01)

(58) Field of Classification Search
None
See application file for complete search history.

(56) References Cited

U.S. PATENT DOCUMENTS

| | | |
|---|---|---|
| 1,092,006 A | 3/1914 | Bailey |
| 3,218,663 A | 11/1965 | Joseph et al. |

(Continued)

FOREIGN PATENT DOCUMENTS

| | | |
|---|---|---|
| CN | 102036420 A | 4/2011 |
| CN | 102713909 B | 8/2015 |
| WO | WO 03036420 | 5/2003 |

OTHER PUBLICATIONS

13. W.M.P. Van Der Aalst et al. (Inheritance of Interorganizational Workflows to Enable Business-to-Business E-Commerce, Electronic Commerce Research, 2: 195-231 (2002) (Year: 2002).*

(Continued)

*Primary Examiner* — Hafiz A Kassim
(74) *Attorney, Agent, or Firm* — Potomac Law Group, PLLC (57) ABSTRACT

A method for permitting a program to be analyzed and tuned includes the steps of receiving a program which itself includes a plurality of stages, where execution of the program follows a plurality of distinct paths, each of the distinct paths including one or more of the stages. The method further includes determining unique paths of the program and determining execution boundaries of the program. In addition, the method includes persisting the unique paths and the execution boundaries in a database, and changing an execution of the program based on the persisted unique paths and execution boundaries.

20 Claims, 5 Drawing Sheets

(56) References Cited

U.S. PATENT DOCUMENTS

| | | | |
|---|---|---|---|
| 5,790,858 A * | 8/1998 | Vogel | G06F 11/3612 |
| | | | 714/35 |
| 5,826,239 A | 10/1998 | Du et al. | |
| 5,864,854 A | 1/1999 | Boyle | |
| 6,549,898 B1 | 4/2003 | Inaba et al. | |
| 6,665,677 B1 | 12/2003 | Wotring et al. | |
| 6,714,943 B1 | 3/2004 | Ganesh et al. | |
| 7,132,015 B2 | 11/2006 | Wen et al. | |
| 7,756,256 B1 | 7/2010 | Rukman et al. | |
| 7,873,376 B2 | 1/2011 | Coelho | |
| 8,090,612 B2 | 1/2012 | Chao et al. | |
| 8,250,064 B1 | 8/2012 | Ramesh et al. | |
| 8,417,678 B2 | 4/2013 | Bone et al. | |
| 8,510,264 B1 | 8/2013 | Tamm et al. | |
| 8,719,225 B1 | 5/2014 | Rath | |
| 8,732,517 B1 | 5/2014 | Stefani et al. | |
| 8,771,662 B2 | 7/2014 | Zhao et al. | |
| 8,775,448 B2 | 7/2014 | Tuatini et al. | |
| 8,839,256 B2 | 9/2014 | Achilles et al. | |
| 8,869,256 B2 | 10/2014 | Sample | |
| 9,031,586 B1 | 5/2015 | Kilpatrick et al. | |
| 9,037,701 B1 | 5/2015 | Sarihan | |
| 9,247,401 B2 | 1/2016 | Lauder | |
| 9,754,265 B2 | 9/2017 | Seelig et al. | |
| 2002/0042731 A1 * | 4/2002 | King, Jr. | G06Q 10/06 |
| | | | 705/7.12 |
| 2002/0087404 A1 * | 7/2002 | Silkey | G06Q 30/02 |
| | | | 705/14.67 |
| 2002/0091538 A1 | 7/2002 | Schwartz et al. | |
| 2003/0144898 A1 | 7/2003 | Bibelnieks et al. | |
| 2003/0195862 A1 | 10/2003 | Harrell et al. | |
| 2004/0015504 A1 | 1/2004 | Ahad et al. | |
| 2004/0078538 A1 * | 4/2004 | Dutt | G06F 8/451 |
| | | | 711/168 |
| 2004/0204973 A1 | 10/2004 | Witting et al. | |
| 2005/0055409 A1 | 3/2005 | Klsarraf et al. | |
| 2005/0071252 A1 | 3/2005 | Henning et al. | |
| 2005/0192986 A1 | 9/2005 | Butler | |
| 2005/0259575 A1 | 11/2005 | Krishnamurthi et al. | |
| 2006/0053181 A1 | 3/2006 | Anand et al. | |
| 2006/0117318 A1 * | 6/2006 | Rumelhart | G06F 9/5038 |
| | | | 718/104 |
| 2006/0190355 A1 | 8/2006 | Jammes et al. | |
| 2006/0253318 A1 | 11/2006 | Ramsey et al. | |
| 2007/0100783 A1 | 5/2007 | Cialini et al. | |
| 2007/0156842 A1 | 7/2007 | Vermeulen et al. | |
| 2007/0208602 A1 | 9/2007 | Nocera et al. | |
| 2007/0250505 A1 | 10/2007 | Yang et al. | |
| 2007/0294663 A1 * | 12/2007 | McGuire | G06F 8/45 |
| | | | 717/108 |
| 2008/0005547 A1 * | 1/2008 | Papakipos | G06F 9/5027 |
| | | | 712/244 |
| 2008/0027788 A1 * | 1/2008 | Lawrence | G06Q 30/02 |
| | | | 705/7.33 |
| 2008/0040191 A1 | 2/2008 | Chakravarty et al. | |
| 2008/0065435 A1 | 3/2008 | Ratzloff | |
| 2008/0262925 A1 | 10/2008 | Kim et al. | |
| 2008/0301256 A1 | 12/2008 | McWilliams et al. | |
| 2008/0320146 A1 * | 12/2008 | Norlund | G06F 9/542 |
| | | | 709/227 |
| 2009/0063474 A1 | 3/2009 | Curry et al. | |
| 2009/0076908 A1 | 3/2009 | Ingleshwar et al. | |
| 2010/0070448 A1 | 3/2010 | Omoigui et al. | |
| 2010/0250477 A1 | 9/2010 | Yadav | |
| 2010/0274661 A1 | 10/2010 | Aaltonen et al. | |
| 2011/0016123 A1 | 1/2011 | Pandey et al. | |
| 2011/0029375 A1 * | 2/2011 | Mason | G06Q 30/02 |
| | | | 705/14.42 |
| 2011/0099152 A1 | 4/2011 | Law et al. | |
| 2011/0196742 A1 * | 8/2011 | Holal | G06Q 10/06 |
| | | | 705/14.54 |
| 2011/0238921 A1 | 9/2011 | Allen et al. | |
| 2011/0282735 A1 | 11/2011 | Kordis et al. | |
| 2012/0130802 A1 | 5/2012 | Shimizu | |
| 2012/0158783 A1 * | 6/2012 | Nice | G06Q 30/02 |
| | | | 707/776 |
| 2012/0173340 A1 * | 7/2012 | Zhao | G06Q 30/0251 |
| | | | 705/14.66 |
| 2012/0191546 A1 | 7/2012 | Phelan et al. | |
| 2012/0192189 A1 * | 7/2012 | Diament | G06Q 10/067 |
| | | | 718/102 |
| 2013/0282837 A1 | 10/2013 | Mayala et al. | |
| 2014/0025763 A1 | 1/2014 | Furlong et al. | |
| 2014/0181039 A1 | 6/2014 | Harrison et al. | |
| 2014/0181579 A1 | 6/2014 | Whitehead et al. | |
| 2015/0026236 A1 | 1/2015 | Solter et al. | |
| 2015/0038181 A1 | 2/2015 | Magadevan et al. | |
| 2015/0085863 A1 | 3/2015 | Wu et al. | |
| 2015/0294349 A1 | 10/2015 | Capel et al. | |
| 2015/0332349 A1 | 11/2015 | Els et al. | |
| 2015/0358259 A1 | 12/2015 | Sterns et al. | |

OTHER PUBLICATIONS

Non-final Office Action dated Sep. 29, 2016 for related U.S. Appl. No. 14/564,658.
Non-Final Office Action for U.S. Appl. No. 12/985,269 dated Feb. 27, 2013.
Final Office Action for U.S. Appl. No. 12/985,269 dated Sep. 24, 2013.
Advisory Action for U.S. Appl. No. 12/985,269 dated Jan. 16, 2014.
Advisory Action for U.S. Appl. No. 12/985,269 dated Dec. 13, 2013.
Non-Final Office Action for U.S. Appl. No. 13/229,610 dated Oct. 4, 2013.
Non-Final Office Action for U.S. Appl. No. 13/229,610 dated Jul. 18, 2012.
Final Office Action for U.S. Appl. No. 13/229,610 dated Jan. 31, 2013.
Non-final Office Action dated Jul. 10, 2014 for U.S. Appl. No. 12/985,269.
Non-final Office Action dated Oct. 17, 2014 for U.S. Appl. No. 13/229,610.
Final Office Action dated Oct. 30, 2014 for U.S. Appl. No. 12/985,269.
Non-final Office Action dated Apr. 6, 2015 for U.S. Appl. No. 12/985,269.
Final Office Action dated May 26, 2015 for U.S. Appl. No. 13/229,610.
Final Office Action dated Jul. 22, 2015 for related U.S. Appl. No. 12/985,269.
Non-final Office Action dated Sep. 25, 2015 for related U.S. Appl. No. 13/229,610.
FrancescoChemolli, SquidFaq, InnerWorkings, Squid Web Proxy Wiki, Oct. 27, 2013, 17 pages.
Twilio, Inc., "TwiML, Message: Twilio's Request", Mar. 26, 2013, 2 pages.
Mobivate, "psms aggregator", Jan. 14, 2013, 3 pages.
Ford, "IT Research BYTE" LOL: Laugh out Loud or Lots of Love? Integrating SMS into Ford Business Processes, Jun. 25, 2010, 6 pages.
Tata Communications, "Mobile Messaging Exchange", 2013, 2 pages.
ExactTarget, "SMS Marketing Term of the Day: Aggregator", Jun. 30, 2009, 3 pages.
Aruhat, "SMS Aggregators: Make sure that your gateways are the best used to give Excellent Services", Mar. 28, 2014, 6 pages.
International Search Report and Written Opinion dated Oct. 15, 2015 for related PCT Patent Application No. PCT/US2015/040225, 11 pages.
Edith Cohen, et al., "Refreshment policies for Web content caches", Computer Networks, Nov. 8, 2001, 14 pages.
Non-final Office Action dated Dec. 21, 2015 for related U.S. Appl. No. 14/029,390.
Alkis Simitsis, "Optimizing Analytic Data Flows for Multiple Execution Engines", May 20-24, 2012.
Non-final Office Action dated Jan. 22, 2016 for related U.S. Appl. No. 12/985,269.

(56) References Cited

OTHER PUBLICATIONS

Notice of Allowance and Fee(s) due dated May 3, 2016 for related U.S. Appl. No. 14/029,390.
Notice of Allowance and Fee(s) due dated May 27, 2016 for related U.S. Appl. No. 12/985,269.
Loudon, "How to Set Up an SMS Campaign System", by Guest, Feb. 23, 2010, pp. 1-23.
Malin, "SMS Marketing for Small Businesses: How Your Small Business Can Thrive with Easy, Affordable, Test Message Marketing!", Published by EZ Texting, Apr. 2012, First Edition, pp. 1-46.
Labrinidis et al., "Caching and Materialization for Web Databases", Foundations and Trends in Datalaw, vol. 2 No. 3, 2009.
Cohen et al., Refreshment Policies for Web Content Caches, IEEE INFOCOM 2001, pp. 1398-1406, Feb. 2001.

* cited by examiner

SYSTEM AND METHOD FOR ANALYZING AND TUNING A MARKETING PROGRAM

CROSS REFERENCE TO RELATED U.S. PATENT APPLICATION(S)

This application is a continuation of U.S. patent application Ser. No. 14/029,390 filed on Sep. 17, 2013 and entitled "SYSTEM AND METHOD FOR ANALYZING AND TUNING A MARKETING PROGRAM". The contents of the aforementioned U.S. patent application are expressly incorporated by reference for all purposes.

BACKGROUND

Field of the Invention

The present invention relates to the field of business process management, and, in particular, to a system and method for analyzing and tuning a marketing program.

Description of the Related Art

A business process management (BPM) engine, or workflow engine, can be used to design and implement business execution actions, such as marketing campaigns, compensation calculation models, and supply chain management. In the marketing campaign example, a marketer can use the BPM engine to configure a series of connected workflow execution components that make up a marketing campaign. Some BPM engines allow the marketer to visually design, manage, and automate a multi-stage lifecycle marketing program through a drag-and-drop user interface and a library of pre-built program templates. An example of such a BPM engine is Responsys Interact Program, an element of the Responsys Interact Marketing Cloud.

However, existing BPM engines are not aware of how stages of a marketing program are connected or of thread execution boundaries within the marketing program. In particular, the program stages do not know how they are related to each other (e.g., whether the stages are connected, how many paths there are between the stages, whether the stages are within the same execution boundary, how many incoming or outgoing paths there are for a stage, etc.), and the BPM also does not know how many different/unique paths are in the program (e.g., the number of paths a group of workflow items can traverse in the program, the number of different paths between a given start stage and end stage, etc.). As a result, such engines cannot, e.g., efficiently identify groups of workflow items input to a given stage within the same thread. For example, two or more groups of workflow items (e.g., users) may be processed along parallel paths to create distinct email messages for each group, and separate requests for launch of an email campaign may then be made after each group is processed. In such a case, multiple requests for and launches of the email campaign may be made within the same execution flow, unnecessarily burdening servers that must consume computing resources such as memory and processing cycles for each of the separate launches.

SUMMARY

One embodiment disclosed herein provides a technique for permitting a program to be analyzed and tuned. The technique generally includes the steps of receiving a program which itself includes a plurality of stages, where execution of the program follows a plurality of distinct paths, each of the distinct paths including one or more of the stages. The technique further includes determining unique paths of the program and determining execution boundaries of the program. In addition, the technique includes persisting the unique paths and the execution boundaries in a database, and changing an execution of the program based on the persisted unique paths and execution boundaries.

Further embodiments of the present invention include a computer system configured to carry out the above technique, or a non-transitory computer-readable storage medium comprising instructions that cause the computer system to carry out the above technique.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments disclosed herein provide techniques for analyzing and tuning a marketing program. According to an embodiment, a marketing program including a plurality of stages, and in which execution of the program follows a plurality of distinct paths, is represented as a graph, and unique paths of the program are determined by traversing the graph. Further, execution boundaries of the program which correspond to distinct process threads are determined by identifying stages which begin new execution boundaries. A database may be used to store and manage information on the determined program paths and execution boundaries, and the information itself may be used to analyze and tune the marketing program.

Hardware Overview

Figure 1:
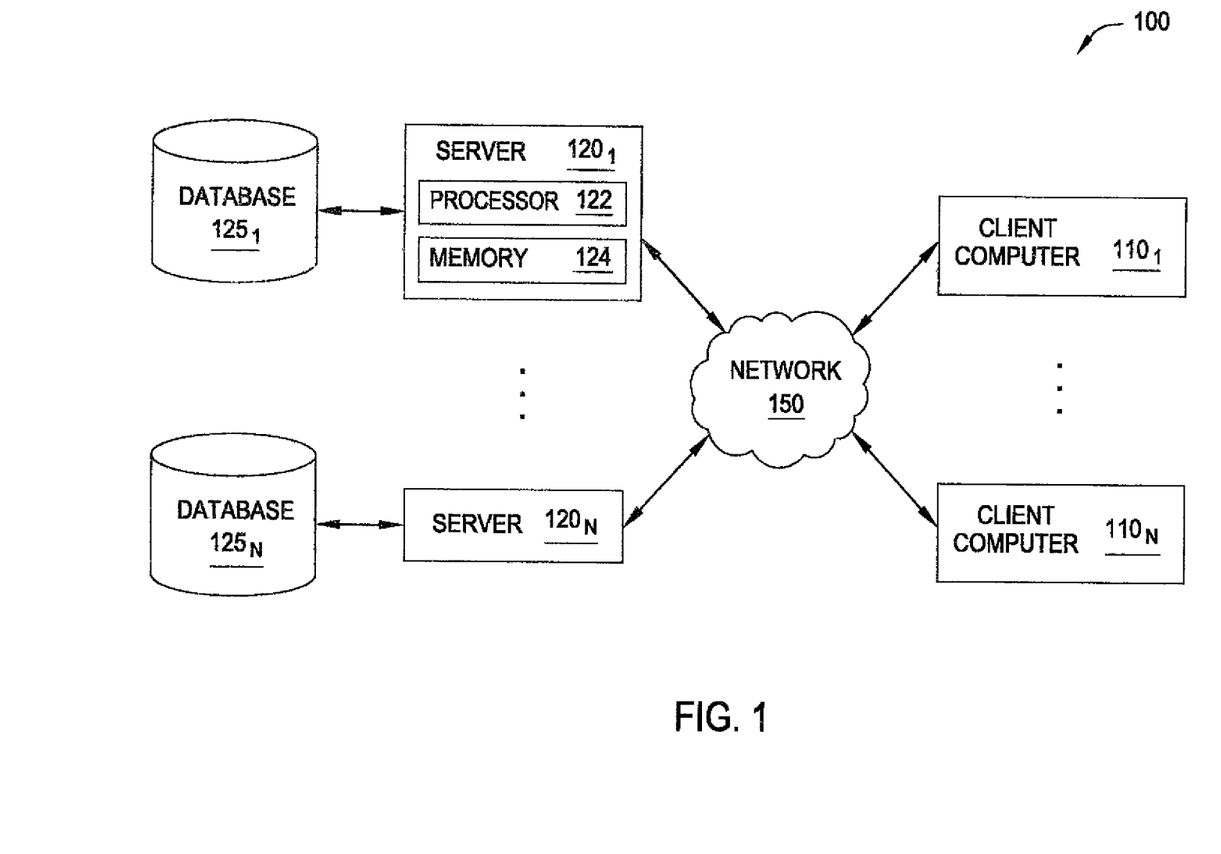
FIG. 1 illustrates a networked computer environment in which embodiments of the invention may be practiced.

FIG. 1 illustrates a networked computer environment in which embodiments may be practiced. As shown, the networked computer environment includes a plurality of client computers 110 (only two of which are shown) and a plurality of server computers 120 with associated content databases 125 for storing content. The client computers 110 and the server computers 120 are connected over a network 150, e.g., the Internet.

Each client computer 110 includes conventional components of a computing device, e.g., a processor, system memory, a hard disk drive, input devices such as a mouse and a keyboard, and output devices such as a monitor, among others. Each server 120 includes a processor 122 and a system memory 124, and manages the contents stored in its respective content storage unit using, e.g., a relational database. The servers 120 may be programmed to communicate with the client computers 110 and other servers using the TCP/IP protocol. The client computers 110 are programmed to execute web browser programs and other software applications and access the web pages and/or applications managed by the servers by specifying a uniform resource locator (URL) for the server into the web browser.

In embodiments described below, users are respectively operating the client computers 110 that are connected to the servers 120 over the Internet. The web pages that are displayed to a user are transmitted from the servers 120 to that user's client computer 110 and processed by the web browser program stored in that user's client computer 110 for display through the monitor of that user's client computer 110.

Client computer 110 may be a personal computer, smart phone, touch pad, touch screen, or any other device suitable for practicing one or more embodiments of the present invention. It should be noted that the present invention can be implemented in hardware, software, or in a combination of hardware and software, e.g., using application specific integrated circuits (ASIC), a general purpose computer or any other hardware equivalents.

In one embodiment, a BPM engine may be stored in memory of the client computer 110 and executed by the processor within the client computer. In other embodiments, the BPM engine may be stored in the memory 124 of the server 120 and executed by the processor 122. The server 120 may be configured to deliver a user interface to the user at the client computer 110 via the network 150. For example, the user interface may be displayed in a web browser executed by the client computer 110.

Program Graph and Execution Boundaries

As described, embodiments disclosed herein provide techniques for analyzing and tuning a marketing program. According to an embodiment, a marketing program including a plurality of stages, and in which execution of the program follows a plurality of distinct paths, is represented as a graph, and unique paths of the program are determined by traversing the graph. Further, execution boundaries of the program which correspond to distinct process threads are determined by identifying stages which begin new execution boundaries. A database may be used to store and manage information on the determined program paths and execution boundaries, and the information itself may be used to analyze and tune the marketing program.

Figure 2A:
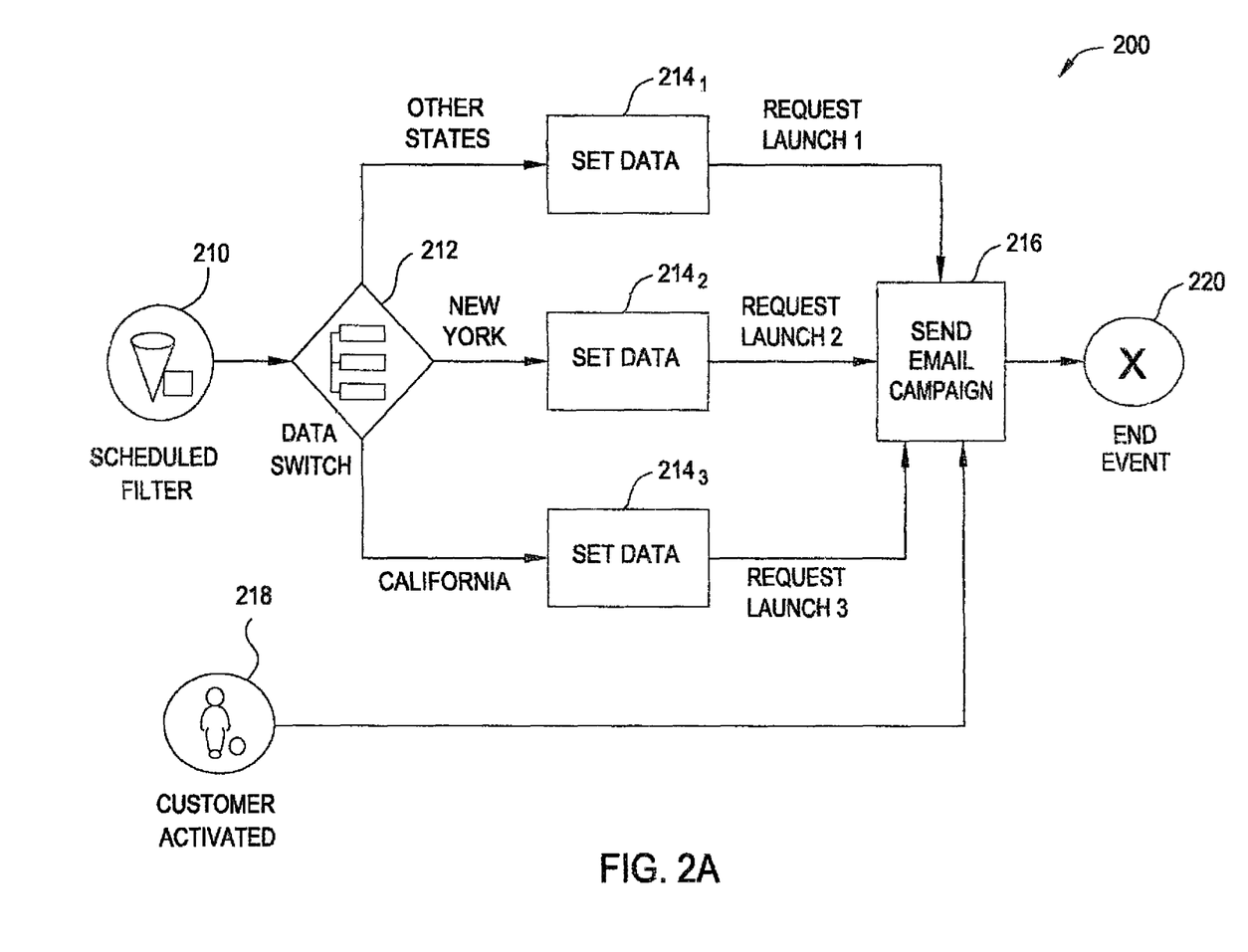
FIG. 2A is a conceptual diagram of a marketing program.

FIG. 2A is a conceptual diagram of a marketing program 200. In one embodiment, a BPM engine, such as Responsys Interact Program, allows a user to visually design, manage, and automate a multi-stage lifecycle program through a drag-and-drop user interface and a library of pre-built program templates. The example shown in FIG. 2 illustrates a marketing program 200 designed by a marketer.

As shown, the marketing program 200 begins with stage 210, which is a scheduled filter stage. In one embodiment, a stage is an abstract class that represents a component within the marketing program 200. Other examples of stages include an email campaign stage, an SMS (short message service) campaign stage, an elapsed timer stage, a gateway (or "switch") stage, or any other technically feasible type of stage. In some embodiments, different business logic may be associated with each of the different types of stages. As used herein, a "scheduled filter" refers to a stage in which a filter or a stored query (e.g., a saved SQL view) is run against an associated list once or on a recurring schedule (daily, weekly or monthly), with resulting matching customers being fed into the marketing program.

The input to the scheduled filter stage 210 comprises a plurality of work items, also referred to as "process instances" or "enactments." In the example shown in FIG. 2A, each work item may represent a different user to which marketing content may be targeted. In one embodiment, at the scheduled filter stage 210, work items (i.e., users) in the input group of work items are filtered according to a predefined condition or conditions. For example, the scheduled filter 210 may be configured to run every day at midnight to filter users and return a list of users whose birthday is on that day.

As shown, stage 212 is a data switch stage which splits an input group of work items into three groups according to a data switch condition. Illustratively, the input group is split according to geography data associated with the input work items, with California residents, New York residents, and residents of other states being split into three separate groups that are processed in respective paths. Then, at stages $214_{1-3}$, the groups are processed by setting data of email messages targeted to those groups. For example, California residents, New York residents, and residents of other states may each receive different promotional offers, and the BPM engine may set data in the email messages targeted to each group to indicate the appropriate promotional offer.

Stage 216 is an email campaign stage in which the BPM engine sends email messages to work items in input group(s). Illustratively, a request to launch the appropriate email campaign is made after each of the data setting stages $214_{1-3}$ is executed. In response, multiple launches may be made, and server resources such as memory and processing cycles may be separately consumed for each launch, which unduly burdens the server. For example, if three launches are performed, three launch requests may be made, information (i.e. first name, last name, address etc. for each user in the group) may be retrieved three times from the database, scrubbing (e.g., removing duplicate user records based on email address, suppressing user records based on invalid email domains, suppressing users who appear on a global suppression list, etc.) may be performed three times, and an initial setup process may also be executed three times. Other miscellaneous activities such as schedulers, data base activity, caching, I/O are also not minimized where three launches are made rather than a single launch.

In one embodiment, the BPM engine may determine, using program path and execution boundary information, whether the scheduled filter 210 and the email campaign 216 stages are connected by more than one path and if these stages execute in the same thread boundary, with a "thread boundary" including one or more stages which are executed by the same thread on, e.g., a distinct server computer. If such is the case, the BPM engine may wait for all set data stages $214_{1-3}$ to finish executing, merge the multiple groups of work items output by these paths into a single merged group, and launch a single email campaign for the merged group, thereby conserving server resources.

Figure 2B:
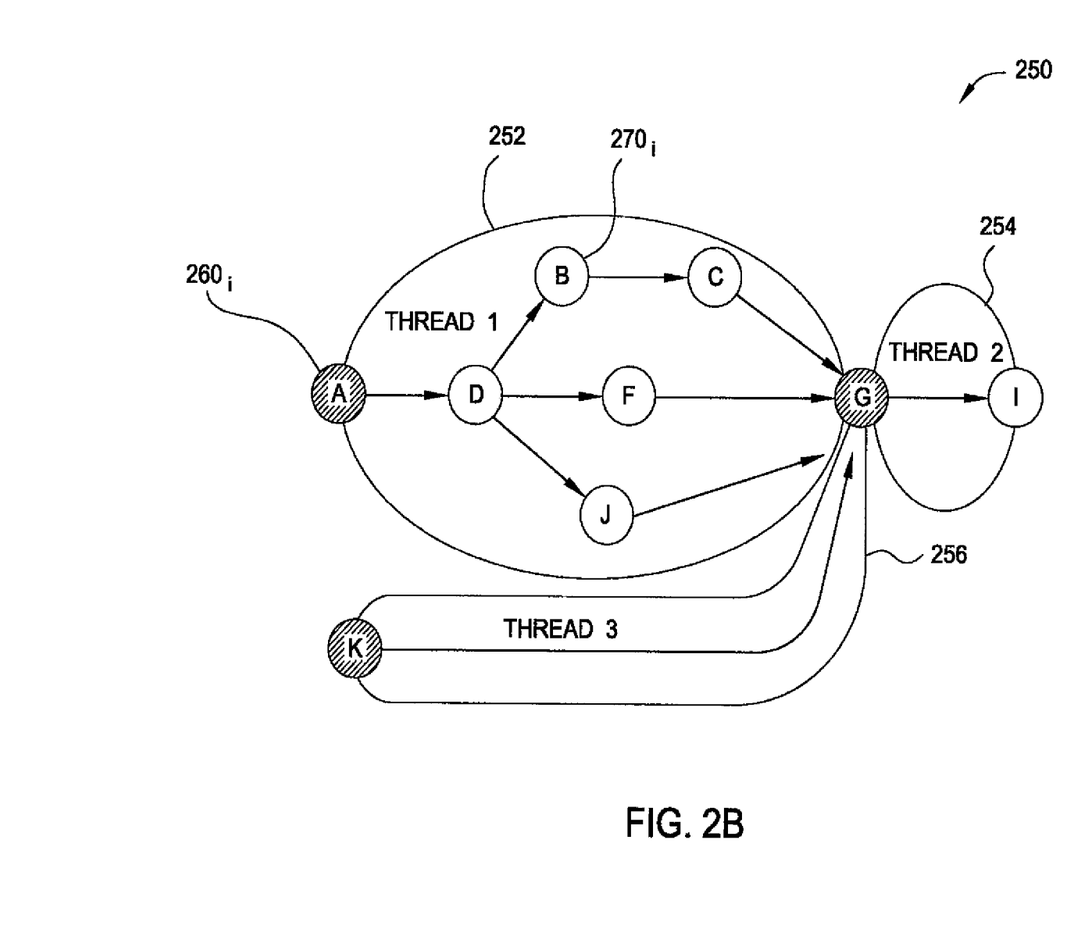
FIG. 2B illustrates a directional graph which represents the marketing program of FIG. 2A and thread boundaries of the marketing program, according to one embodiment.

FIG. 2B illustrates a graph 250 which represents the marketing program 200 of FIG. 2A and thread boundaries of the marketing program 200, according to one embodiment. As shown, the graph 250 is a directional graph which includes nodes $260_i$ and $270_i$, each of which corresponds to one of the stages of the marketing program 200. That is, the graph 250 may be generated from the marketing program 200 by creating one graph node for each stage in the program 200 and connecting the nodes according to the execution flow of the program 200. As discussed in greater detail below, the graph 250 may then be traversed to identify unique paths through the marketing program 200, and the unique paths may be normalized and persisted in a database for later analysis and program tuning. For example, unique paths through the marketing program 200 include (1) A→D→B→C→G→I; (2) A→D→F→G→I; (3) A→D→J→G→I; and (4) K→G→I.

As shown, shaded nodes $260_i$ represent thread creator stages (also referred to herein as thread boundary creator stages), while unshaded nodes $270_i$ represent thread follower stages. In one embodiment, thread creator stages may be stages which start new execution (thread) flows. Illustratively, thread creator stages represented by nodes A, G, and K start threads 1, 2, and 3, respectively. Each such thread may itself include one or more stages and be executed on, e.g., a separate server computer. Note, while nodes A, G, and K represent thread creator stages, the boundaries of threads are defined by the pairs A-G, K-G, and G-I. For example, A and G are within the same thread boundary, as they define the boundary of thread 1.

Stages which execute in a thread but do not start the thread are thread follower stages, represented by unshaded nodes $270_i$. Such thread follower stages are generally not self-initiated, and are instead initiated by a thread creator stage or another thread follower stage. Thread creator and thread follower stages may generally be distinguished based on characteristics of the stages. In one embodiment, a user may specify certain types of stages as thread creator stages and other types of stages as thread follower stages. Examples of thread creator stages may include start event stages for customer activation, customer deactivation, scheduled filters, and custom events; timer stages such as elapse timers, target timers, and end timers; and campaign activity stages such as email campaigns, SMS campaigns, and other forms of communications to customers. An example of a thread follower stage is a set data stage. Other examples of thread follower stages may include switch stages for selecting between alternatives, such as data switches, allocation switches, and performance switches. As used herein, a customer activation stage refers to a stage in which a new customer/user is added into the system, or a previously deactivated user is re-activated, using, e.g., email, mobile, social, display or web channels. Deactivation may generally be the opposite of activation. As used herein, a set data stage refers to a stage in which a list field or profile extension field is either set to a given value, or the value is modified by a specified amount or changed to a value that is supplied by an event. A marketer may be allowed to choose one of these approaches and the field value to set. As used herein a send email campaign stage refers to a stage in which email campaign messages are sent to customers. As used herein, a timer is a stage which waits for a specified amount of time or until a specific date/time. For example, a timer may be included in a marketing campaign to allow customers to respond to the campaign before sending follow-up messages. An elapsed timer in particular may wait for a specified number of days before moving to the next program stage. As used herein, an end event refers to a stage which terminates a program flow, exiting the program.

Figure 3:
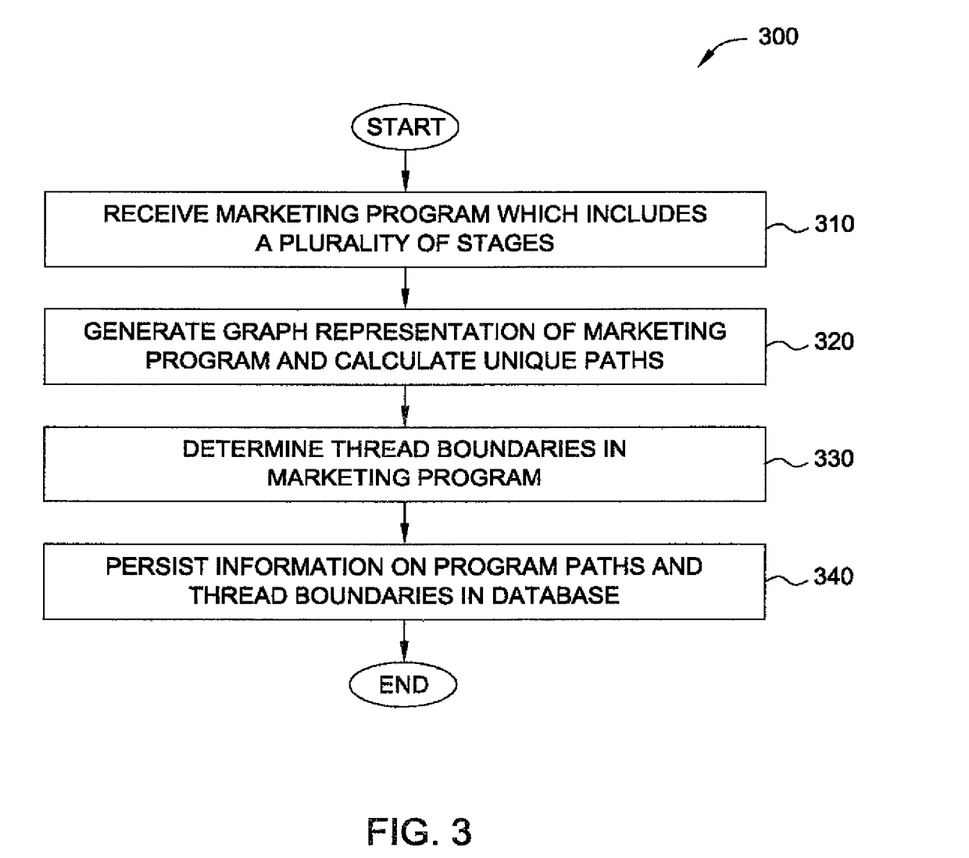
FIG. 3 illustrates a method for determining unique paths and thread boundaries in a marketing program and persisting the same in a database, according to one embodiment of the invention.

FIG. 3 illustrates a method 300 for determining unique paths and thread boundaries in a marketing program and persisting the same in a database, according to one embodiment. As shown, the method begins at step 310, where a BPM engine receives a marketing program which includes a plurality of stages. For example, the stages may include an email campaign stage, an SMS (short message service) campaign stage, an elapsed timer stage, a gateway (or "switch") stage, or any other technically feasible type of stage. As discussed, the campaign stages may be specified by a user using the BPM engine which allows a user to visually design, manage, and automate a multi-stage lifecycle program through a drag-and-drop user interface and a library of pre-built program templates.

At step 320, the BPM engine generates a graph representation of the marketing program and calculates unique execution paths in the program. In one embodiment, the BPM engine may generate the graph by creating a node in the graph for each stage defined by the user (e.g., the marketer who created the marketing program), such that the marketing program is represented as a directional graph similar to that shown in FIG. 2B. After generating the directional graph, the BPM engine may traverse the graph to identify unique paths which work items may take through the marketing program. For example, the BPM engine may traverse the graph using a breadth-first search algorithm. In another embodiment, the BPM engine may generate the graph and calculate unique program execution paths upon the publishing of the program as an executable.

At step 330, the BPM engine determines thread boundaries in the marketing program. As discussed, each thread boundary may include one or more stages which are executed by the same thread on, e.g., a distinct server computer. In one embodiment, the thread boundaries may be determined by identifying nodes in the directed graph which represent stages that start new execution (thread) flows and are thus at the boundaries of threads. The types of nodes which are thread creators may be, e.g., user-specified. For example, thread boundary creator nodes may include start event nodes, timer nodes, and campaign activity nodes. Start event nodes may include nodes which represent customer activation, customer deactivation, scheduled filters, and customer events. Timers may include, e.g., elapsed timers, target timers, and end timers. Campaign activities may include email campaigns, SMS campaigns, and other forms of communications to customers. In contrast to thread-creating nodes, the user may also define thread follower nodes which represent stages that do not start new threads. As discussed, thread follower stages are generally not self-initiated, and are instead initiated by a thread creator stage or another thread follower stage. Examples of thread follower nodes may include setting date and switches such as data switches, allocation switches, and performance switches.

At step 340, the BPM engine persists information on the program paths and thread boundaries in a database. In one embodiment, the program paths may be normalized using, e.g., a well-known database normalization technique. For example, information for the marketing program illustrated in FIG. 2 may be stored as follows:

| PROGRAM_ID | FROM_STAGE_ID | TO_STAGE_ID | TH_BOUNDARY_ID |
|---|---|---|---|
| 1001 | A (Scheduled Filter X) | D | 1 |
| 1001 | D | B | 1 |
| 1001 | B | C | 1 |
| 1001 | C | G (Campaign) | 1 |
| 1001 | G (Email Campaign Y) | I | 2 |
| 1001 | D | F | 1 |
| 1001 | F | G (Campaign) | 1 |
| 1001 | D | J | 1 |
| 1001 | J | G (Campaign) | 1 |
| 1001 | K (Customer Activated Z) | G (Campaign) | 3 |

Information saved in the database may be used in later analysis, such as to merge groups which have been processed by multiple paths connecting a filter stage and an email (or SMS) campaign stage in the same thread boundary, as discussed in greater detail below with respect to FIG. 4.

Other use cases include determining if a given filter stage and a given email (or SMS) campaign stage execute in the same thread, determining all in-paths to a given email (or SMS) campaign stage, determining all stages executed before a given email (or SMS) campaign stage, determining all in-paths to a given email (or SMS) campaign stage which execute in the same thread, determining whether two given stages are connected, finding the shortest or longest paths between two given stages by time or number of stages, etc. In each of these cases, a marketer (or other user) may be interested in how the marketing program is executed so that the marketing program, including the manner in which the program executes, may be manually or automatically redesigned (i.e., tuned) in various ways to better suit marketing needs and conserve system resources.

Figure 4:
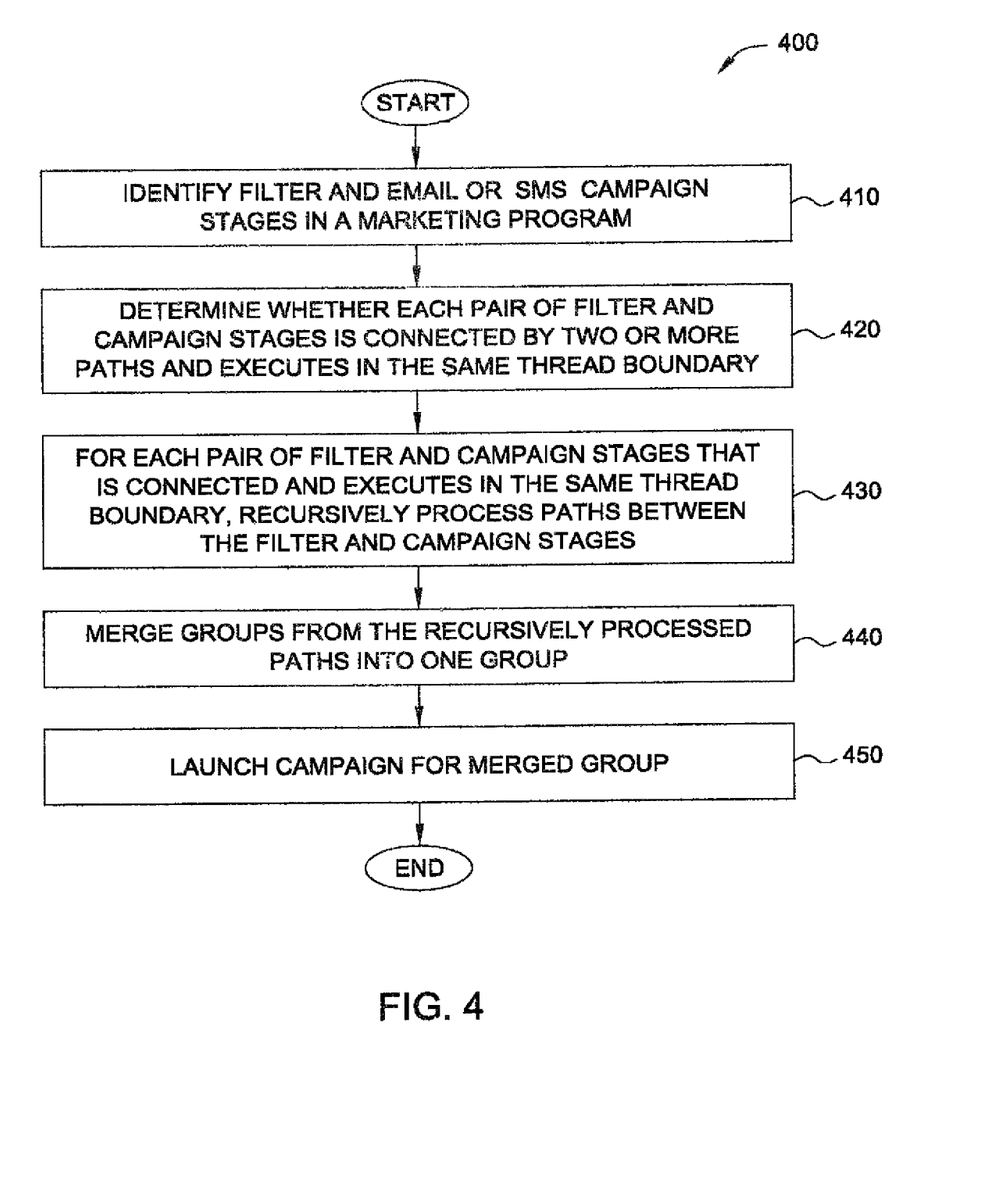
FIG. 4 illustrates a method for conserving computational resources using program path and thread boundary information, according to one embodiment of the invention.

FIG. 4 illustrates a method 400 for conserving computational resources using program path and thread boundary information, according to one embodiment. As shown, the method 400 begins at step 410, where a BPM engine identifies filter and email or SMS campaign stages in a marketing program. As discussed, program paths, including stages in those paths, may be identified and persisted in a database. In such a case, the filter and email or SMS campaign stages may be identified by, e.g., querying the database to select the desired stages. In another embodiment, on deployment of the marketing program, or server start-up, the BPM may read all of the unique paths for the marketing program from the database and cache these paths for quick access. Then, on program execution, the BPM may access such a cache in lieu of the database.

At step 420, the BPM engine determines whether each pair of filter and campaign stages is connected by two or more paths and executes in the same thread boundary. Once again, the database in which program paths are persisted may be queried. For example, to determine whether filter stage X and email campaign stage Y are connected by two or more paths and are in the same thread boundary, the following SQL query may be executed:
  SELECT COUNT(1)
  FROM program_graph a, program_graph b
  WHERE a.program_id=b.program_id
  AND a.from_stage_id='X'
  AND b.to_stage_id='Y'
  AND a.from_stage_type='scheduled_filter'
  AND b.stage_type='email_campaign'
  AND a.th_boundary_id=b.th_boundary_id At step 430, the BPM engine recursively processes paths between each pair of filter and campaign stages that is connected and that executes in the same thread boundary. Each path may itself include one or more stages, such as set data stages, which are executed when the path is processed.

At step 440, the BPM engine merges the processed groups at the campaign stage into one group. Then, at step 450, the BPM engine launches the campaign for the merged group. For example, in an email campaign stage, launching the campaign may include sending an email to each recipient in the merged group. As another example, in an SMS campaign stage, SMS messages may be sent synchronously one at a time to each recipient in the merged group. Merging the groups of work items and launching a single email campaign for the merged group conserves server resources such as memory, as resources are not then consumed for multiple separate launches.

Although discussed above primarily with respect to multi-stage lifecycle marketing programs, techniques disclosed herein may also be applied to other types of multi-stage programs.

Advantageously, techniques disclosed herein reduce computational resources required to execute a marketing program relative to prior art techniques by, e.g., permitting groups of workflow items input to a given stage within the same thread to be identified. Given such information, the marketing program may be manually, or automatically, analyzed and tuned to, e.g., merge groups before launching a single email or SMS campaign, among other things. This can be more efficient than executing the program blindly, without taking advantage of the particular paths of execution, connections between stages, execution boundaries, etc. Further, functionality and throughput of the system may not be affected by such analysis and tuning.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for tuning and executing a plurality of connected processes, the method comprising:
   identifying a plurality of stages of processing that are performed and consume computing resources including memory and processing cycles to transmit a plurality of electronic communications; and
   reducing consumption of the computing resources to transmit the plurality of electronic communications at least by:
      identifying a plurality of distinct paths between a first stage and a second stage within the plurality of stages of processing;
      determining thread boundaries that corresponds to at least the first stage and the second stage based in part or in whole upon a directed graph, at least one of the thread boundaries identifying the first stage and the second stage as being executable by a common thread using the same computing resources, the directed graph comprising a node for each of the plurality of stages, thread boundary creator nodes that correspond to stages that start a new thread and thread follower nodes that correspond to stages that do not start a new thread;
      persisting unique paths for the plurality of stages of processing and thread boundaries in a database and normalizing the unique paths;
      determining whether the first stage and the second stage are connected by two or more paths within the at least one of the thread boundaries;
      in response to determining that the first stage and the second stage are connected by the two or more paths within the one of the thread boundaries:
         launching the second stage in a single launch using first computing resources for a merged group that is generated by merging groups of work items that are output by the two or more paths, each of the two or more paths using separate computing resources and each work item representing a different user to which electronic communications may be targeted, wherein the merged group comprises a campaign stage that transmits electronic communications; and
         executing the single launch to transmit the plurality of electronic communications for the merged group.

2. The method of claim 1, the act of determining the thread boundaries comprising:
   identifying a set of stages of processing from the plurality of stages of processing, the set of stages of processing starting one or more new execution flows;
   representing the set of stages of processing with the plurality of nodes; and
   generating the directed graph with the plurality of nodes.

3. The method of claim 1, the act of determining the thread boundaries comprising:
   identifying the directed graph;
   identifying a plurality of nodes in the directed graph, the plurality of nodes start new execution flows; and
   determining at least a part of the thread boundaries using the plurality of nodes.

4. The method of claim 3, wherein the plurality of nodes includes multiple thread boundary creator nodes.

5. The method of claim 4, wherein the multiple thread boundary creator nodes include at least one of a start event node, a timer node, or an activity node.

6. The method of claim 5, wherein the start event node is characterized by representing activation or deactivation by a user, a scheduled filter, or a user event; and the timer node includes an elapsed timer, a target timer, or an end timer.

7. The method of claim 3, further comprising:
   identifying one or more thread follower nodes in the directed graph, wherein the one or more thread follower nodes do not start new threads of execution and are initiated by at least one stage in the plurality of stages.

8. The method of claim 7, further comprising:
   setting a data switch, an allocation switch, or a performance switch with at least one thread follower node.

9. The method of claim 1, further comprising:
   determining whether the plurality of distinct paths between the first stage and the second stage correspond to the at least one of the thread boundaries, the first stage being a filter stage that filters input data to the groups, and the second stage being a campaign stage.

10. The method of claim 9, further comprising:
    changing an execution of the plurality of stages at least by accessing at least some of the unique paths and the thread boundaries from a cache that is remote from the database, instead of accessing the at least some of the unique paths and the thread boundaries from the database; and
    processing the groups of work items in the two or more paths output by the two or more paths.

11. A non-transitory computer-readable medium storing instructions that, when executed by a processor of a computer system, cause a processor to perform a set of acts for tuning and executing a plurality of stages of processing, the set of acts comprising:
    identifying a plurality of stages of processing that are performed and consume computing resources including memory and processing cycles to transmit a plurality of electronic communications; and
    reducing consumption of the computing resources to transmit the plurality of electronic communications at least by:
       identifying a plurality of distinct paths between a first stage and a second stage within the plurality of stages of processing;
       determining thread boundaries that corresponds to at least the first stage and the second stage based in part or in whole upon a directed graph, at least one of the thread boundaries identifying the first stage and the second stage as being executable by a common thread using the same computing resources, the directed graph comprising a node for each of the plurality of stages, thread boundary creator nodes that correspond to stages that start a new thread and thread follower nodes that correspond to stages that do not start a new thread;
       persisting unique paths for the plurality of stages of processing and thread boundaries in a database and normalizing the unique paths; determining whether the first stage and the second stage are connected by two or more paths within the at least one of the thread boundaries;
       in response to determining that the first stage and the second stage are connected by the two or more paths within the one of the thread boundaries:
          launching the second stage in a single launch using first computing resources for a merged group that is generated by merging groups of work items that are output by the two or more paths, each of the two or more paths using separate computing resources and each work item representing a different user to which electronic communications may be targeted, wherein the merged group comprises a campaign stage that transmits electronic communications; and executing the single launch to transmit the plurality of electronic communications for the merged group.

12. The computer-readable medium of claim 11, the set of acts further comprising:

identifying a set of stages of processing from the plurality of stages of processing, the set of stages of processing starting one or more new execution flows;

representing the set of stages of processing with the plurality of nodes; and generating the directed graph with the plurality of nodes.

13. The computer-readable medium of claim 11, the set of acts further comprising:

identifying the directed graph;

identifying a plurality of nodes in the directed graph, the plurality of nodes start new execution flows; and determining at least a part of the thread boundaries using the plurality of nodes.

14. The computer-readable medium of claim 13, wherein the set of acts further comprises:

identifying one or more thread follower nodes in the directed graph, wherein the one or more thread follower nodes do not start new threads of execution and are initiated by at least one stage in the plurality of stages; and setting a data switch, an allocation switch, or a performance switch with at least one thread follower node.

15. The computer-readable medium of claim 11, wherein the set of acts further comprises:

determining whether the plurality of distinct paths between the first stage and the second stage correspond to the at least one of the thread boundaries, the first stage being a filter stage that filters input data to the groups, and the second stage being a campaign stage;

changing an execution of the plurality of stages at least by accessing at least some of the unique paths and the thread boundaries from a cache that is remote from the database, instead of accessing the at least some of the unique paths and the thread boundaries from the database; and processing the groups of work items in the two or more paths output by the two or more paths.

16. A computer system, comprising:

a non-transitory computer accessible storage medium storing thereupon a plurality of instructions; and one or more processors configured to execute at least some of the plurality of instructions to:

identify a plurality of stages of processing that are performed and consume computing resources including memory and processing cycles to transmit a plurality of electronic communications; and reduce consumption of the computing resources to transmit the plurality of electronic communications at least by:

identifying a plurality of distinct paths between a first stage and a second stage within the plurality of stages of processing;

determining thread boundaries that corresponds to at least the first stage and the second stage based in part or in whole upon a directed graph, at least one of the thread boundaries identifying the first stage and the second stage as being executable by a common thread using the same computing resources, the directed graph comprising a node for each of the plurality of stages, thread boundary creator nodes that correspond to stages that start a new thread and thread follower nodes that correspond to stages that do not start a new thread;

persisting unique paths for the plurality of stages of processing and thread boundaries in a database and normalizing the unique paths;

determining whether the first stage and the second stage are connected by two or more paths within the at least one of the thread boundaries;

in response to determining that the first stage and the second stage are connected by the two or more paths within the one of the thread boundaries:

launching the second stage in a single launch using first computing resources for a merged group that is generated by merging groups of work items that are output by the two or more paths, each of the two or more paths using separate computing resources and each work item representing a different user to which electronic communications may be targeted, wherein the merged group comprises a campaign stage that transmits electronic communications; and executing the single launch to transmit the plurality of electronic communications for the merged group.

17. The computer system of claim 16, wherein the processor that is configured to execute the plurality of instructions to reduce the consumption of the computing resources is further configured to execute the plurality of instructions to:

identify a set of stages of processing from the plurality of stages of processing, the set of stages of processing starting one or more new execution flows;

represent the set of stages of processing with the plurality of nodes; and generate the directed graph with the plurality of nodes.

18. The computer system of claim 16, wherein the processor that is configured to execute the plurality of instructions to reduce the consumption of the computing resources is further configured to execute the plurality of instructions to:

identify the directed graph;

identify a plurality of nodes in the directed graph, the plurality of nodes start new execution flows; and determine at least a part of the thread boundaries using the plurality of nodes.

19. The computer system of claim 18, wherein the processor that is configured to execute the plurality of instructions to reduce the consumption of the computing resources is further configured to execute the plurality of instructions to:

identify one or more thread follower nodes in the directed graph, wherein the one or more thread follower nodes do not start new threads of execution and are initiated by at least one stage in the plurality of stages; and set a data switch, an allocation switch, or a performance switch with at least one thread follower node.

20. The computer system of claim 16, wherein the processor that is configured to execute the plurality of instructions to reduce the consumption of the computing resources is further configured to execute the plurality of instructions to:
  determine whether the plurality of distinct paths between the first stage and the second stage correspond to the at least one of the thread boundaries, the first stage being a filter stage that filters input data to the groups, and the second stage being a campaign stage;
  change an execution of the plurality of stages at least by accessing at least some of the unique paths and the thread boundaries from a cache that is remote from the database.

* * * * *